United States Patent
Dogin et al.

(10) Patent No.: US 10,861,007 B2
(45) Date of Patent: Dec. 8, 2020

(54) MULTI-ACCOUNT PAYMENT CARD

(71) Applicant: MasterCard International Incorporated, Purchase, NY (US)

(72) Inventors: Jennifer R. Dogin, Mamaroneck, NY (US); Sean Kirch, Mahwah, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 906 days.

(21) Appl. No.: 14/489,026

(22) Filed: Sep. 17, 2014

(65) Prior Publication Data
US 2015/0356551 A1    Dec. 10, 2015

Related U.S. Application Data

(60) Provisional application No. 62/007,693, filed on Jun. 4, 2014.

(51) Int. Cl.
*G06Q 20/34* (2012.01)
*G06Q 20/36* (2012.01)
*G06Q 20/38* (2012.01)

(52) U.S. Cl.
CPC ......... *G06Q 20/3572* (2013.01); *G06Q 20/36* (2013.01); *G06Q 20/38* (2013.01)

(58) Field of Classification Search
CPC .. G06Q 20/3572; G06Q 20/36; G06Q 20/204; G06Q 20/38
See application file for complete search history.

(56) References Cited

U.S. PATENT DOCUMENTS

| | | | | |
|---|---|---|---|---|
| 5,635,695 A | * | 6/1997 | Feiken | G06Q 20/341 235/380 |
| 6,494,367 B1 | * | 12/2002 | Zacharias | G06Q 20/04 235/379 |
| 8,606,709 B2 | | 12/2013 | Gupta | |
| 9,965,756 B2 | * | 5/2018 | Davis | G06Q 20/227 |
| 2004/0117302 A1 | * | 6/2004 | Weichert | G06Q 20/102 705/40 |

(Continued)

OTHER PUBLICATIONS

"Notification of Transmittal of the International Search Report and the Written Opinion of the International Searching Authority, or the Declaration", dated Aug. 26, 2015, for International Application No. PCT/US15/33979, 8pgs.

(Continued)

*Primary Examiner* — Florian M Zeender
*Assistant Examiner* — Vanessa Deligi
(74) *Attorney, Agent, or Firm* — Buckley, Maschoff & Talwalkar LLC

(57) ABSTRACT

A method includes reading a card number from a payment device at a point of sale (POS) terminal. The method further includes transmitting a message from the POS terminal to a remote host computer, where the message includes the card number. Still further, the method includes receiving wallet data at the POS terminal from the host computer. The wallet data indicates a plurality of payment accounts associated with the card number. In addition, the method includes displaying the wallet data at the POS terminal and receiving a selection indication from a user at the POS terminal, where the selection indication is for selecting one of the payment accounts.

17 Claims, 9 Drawing Sheets

(56) References Cited

U.S. PATENT DOCUMENTS

| | | | |
|---|---|---|---|
| 2005/0249383 A1 | 11/2005 | Maritzen et al. | |
| 2005/0261968 A1* | 11/2005 | Randall | G06Q 20/102 705/16 |
| 2007/0063017 A1* | 3/2007 | Chen | G06Q 20/02 235/379 |
| 2007/0100754 A1* | 5/2007 | Brown | G06Q 20/26 705/50 |
| 2011/0180598 A1* | 7/2011 | Morgan | G06Q 20/32 235/380 |
| 2011/0282753 A1* | 11/2011 | Mullen | G06T 7/62 705/14.73 |
| 2012/0123880 A1 | 5/2012 | Craft et al. | |
| 2012/0296741 A1* | 11/2012 | Dykes | G06Q 20/36 705/14.53 |
| 2012/0310760 A1 | 12/2012 | Phillips et al. | |
| 2012/0310826 A1* | 12/2012 | Chatterjee | G06Q 20/322 705/41 |
| 2013/0054454 A1 | 2/2013 | Purves et al. | |
| 2013/0200999 A1* | 8/2013 | Spodak | G05B 1/01 340/5.65 |
| 2014/0058935 A1 | 2/2014 | Mijares | |

OTHER PUBLICATIONS

"Communication: Supplementary European Search Report", European Patent Office, dated Oct. 17, 2017, for European Application No. 15803279.7-1871, 7pgs.

"Communication pursuant to Article 94(3) EPC: European Examination Report", dated Nov. 26, 2019 (Nov. 26, 2019), European Patent Office, for European Application No. 15803279.7-1217, 10pgs.

* cited by examiner

MULTI-ACCOUNT PAYMENT CARD

CROSS REFERENCE TO RELATED APPLICATION

This application claims the benefit of U.S. Provisional Patent Application No. 62/007,693 filed on Jun. 4, 2014, the contents of which are hereby incorporated by reference for all purposes.

BACKGROUND

Payment card accounts such as credit card accounts and debit card accounts are in widespread use. In one conventional manner of accessing a payment card account, the account holder presents a plastic card at the point of sale in a retail store. The point of sale device reads account information from the card (e.g., via a magnetic stripe or through wireless communication with an integrated circuit in the card, or via electrical contacts on the card) and initiates a payment card account transaction using the information read by the card.

Payment card accounts are also widely used in e-commerce. For example, an account holder may use a personal computer or a smartphone to access a merchant's online store webpage. After selecting goods for purchase and then opting for "check out", the account holder is prompted to enter his/her payment card account information into a data entry screen downloaded to his/her computer (or smartphone). The merchant's e-commerce host computer then initiates a payment card account transaction using the information that was entered by the account holder.

Given that many users of payment card accounts may have more than one such account, there have been proposals for so-called digital wallets. According to one type of proposed arrangement, a wallet service provider maintains "digital wallets" for a large number of users. Each user causes some or all of his/her payment card accounts to be enrolled in his/her digital wallet, and the wallet service provider stores the corresponding information in a data partition that is dedicated to the respective user and thus forms his/her "digital wallet". When the user seeks to check out at the conclusion of an e-commerce shopping transaction, the user is given the option to access his/her wallet at the digital service provider. Via data communication among the user's computer/smartphone, the merchant's e-commerce host computer and the wallet service provider's computer, the user is presented with an option to select one of his/her enrolled payment card accounts for use in the current e-commerce transaction. This may require only one or two "clicks" on the part of the user. Once the user selects the desired payment account from his/her digital wallet, the merchant is enabled to use the corresponding account information to initiate a payment card account transaction using the account selected by the user. This type of arrangement may offer great convenience to the user/online shopper, because he/she is freed from entering the payment card account information details as part of the e-commerce transaction. At the same time, the user has the option of selecting among various payment card accounts, and is not required to entrust his/her payment card account information for storage on the merchant's e-commerce computer.

Another type of proposal for a digital wallet is based on payment-enabled smartphones or similar mobile devices. Instead of storing just one set of payment card account credentials in a payment-enabled smartphone, the user may be allowed to enter the information for several different payment card accounts into the payment-enabled smartphone. The smartphone runs a wallet application, which manages the user's access to the payment card account information stored in the smartphone. At the point of sale, the user interacts with the smartphone wallet application via the smartphone user interface to select one of the payment card accounts for which information was stored in the smartphone. The smartphone then wirelessly transmits the information for the selected payment card account to the point of sale terminal via NFC (Near Field Communication) or other standard communication protocol. The point of sale terminal, in turn, initiates a payment card account transaction based on the payment card account information it received from the smartphone.

The present inventors have now recognized an opportunity for a highly convenient way to implement and access the advantages of a digital wallet.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present invention, a wallet services system allows a user to access his/her digital wallet at the point of sale by presenting a payment card to the POS terminal. The POS terminal reads the card and requests the user's digital wallet data from a remote host computer operated by a wallet service provider. The digital wallet data is downloaded from the remote host computer to the POS terminal. The POS terminal has a display component that displays to the user information that represents the payment card accounts enrolled in the user's digital wallet. The user is enabled to interact with the POS terminal to select from among those accounts to indicate the account that is to be used for the current transaction at the point of sale. Thus the user is able to use a single payment card to access several different payment card accounts at the point of sale. In some embodiments, another advantage may be that the payment card account information is not stored at the POS terminal.

Figure 1:
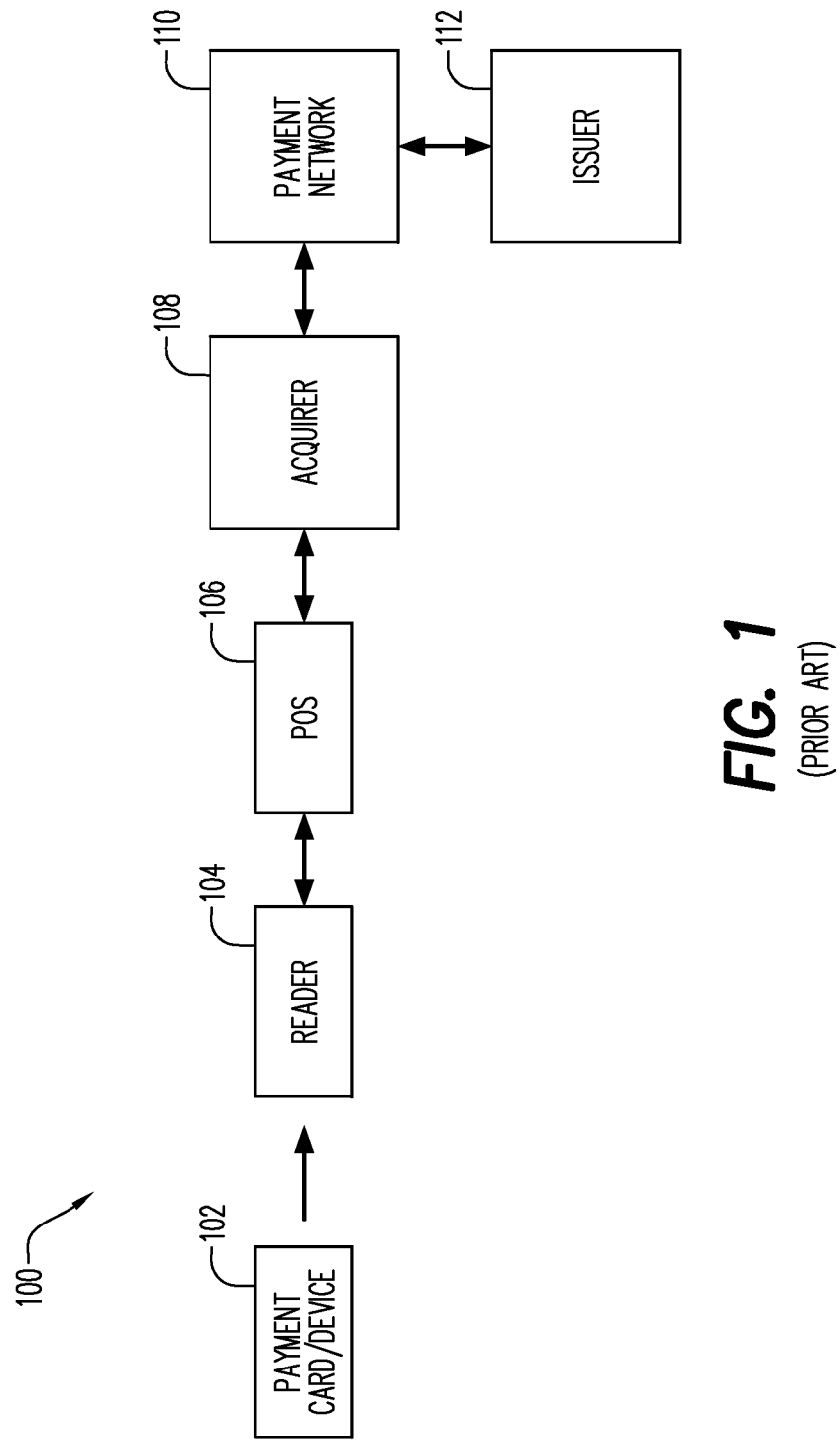
FIG. 1 is a block diagram that illustrates a conventional payment system.

By way of background, a conventional payment system will first be briefly described. FIG. 1 is a block diagram that illustrates a conventional payment system 100.

The system 100 includes a conventional payment card/device 102. As is familiar to those who are skilled in the art, the payment card/device 102 may be a magnetic stripe card, an IC (integrated circuit) card, a fob, a payment-enabled smartphone, etc.

The system 100 further includes a reader component 104 associated with a POS terminal 106. In some known manner (depending on the type of the payment card/device 102) the reader component 104 is capable of reading the payment card account number and other information from the payment card/device 102.

The reader component 104 and the POS terminal 106 may be located at the premises of a retail store and operated by a sales associate of the retailer for the purpose of processing retail transactions. The payment card/device 102 is shown in FIG. 1 to be interacting with the reader component 104 and the POS terminal 106 for the purpose of executing such a transaction.

A computer 108 operated by an acquirer (acquiring financial institution) is also shown as part of the system 100 in FIG. 1. The acquirer computer 108 may operate in a conventional manner to receive an authorization request for the transaction from the POS terminal 106. The acquirer computer 108 may route the authorization request via a payment network 110 to the server computer 112 operated by the issuer of a payment card account that is associated with the payment card/device 102. As is also well known, the authorization response generated by the payment card issuer server computer 112 may be routed back to the POS terminal 106 via the payment network 110 and the acquirer computer 108.

One well known example of a payment network is referred to as the "Banknet" system, and is operated by MasterCard International Incorporated, which is the assignee hereof.

The payment card issuer server computer 112 may be operated by or on behalf of a financial institution ("FI") that issues payment card accounts to individual users. For example, the payment card issuer server computer 112 may perform such functions as (a) receiving and responding to requests for authorization of payment card account transactions to be charged to payment card accounts issued by the FI; and (b) tracking and storing transactions and maintaining account records.

The components of the system 100 as depicted in FIG. 1 are only those that are needed for processing a single transaction. A typical payment system may process many purchase transactions (including simultaneous transactions) and may include a considerable number of payment card issuers and their computers, a considerable number of acquirers and their computers, and numerous merchants and their POS terminals and associated proximity reader components. The system may also include a very large number of payment card account holders, who carry payment cards or other devices for initiating payment transactions by presenting an associated payment card account number to the reader component of a POS terminal.

Figure 2:
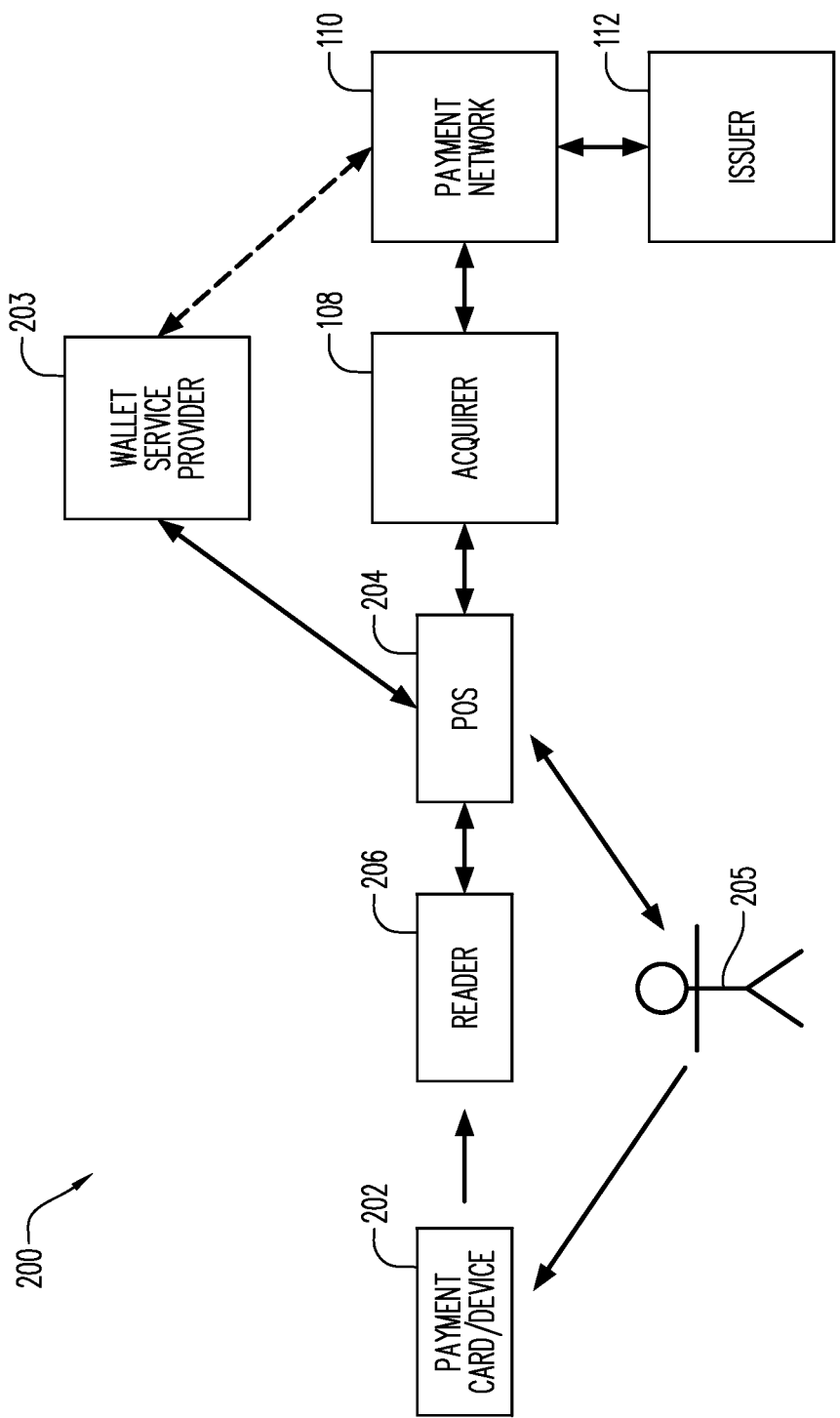
FIG. 2 is a block diagram that illustrates a payment system provided in accordance with aspects of the present invention.

FIG. 2 is a block diagram that illustrates a payment system 200 provided in accordance with aspects of the present invention. (As was the case in FIG. 1, the payment system is depicted in FIG. 2 only in terms of components needed for a single transaction; in practice, and as will be discussed below, the payment system 200 may include many more instances of at least some components.)

As illustrated in FIG. 2, and like the conventional system 100, the payment system 200 includes a payment card/device 202. Advantageously, the payment card/device 202 may be, in hardware terms, a conventional payment IC card. In some embodiments, the software aspects of the payment card/device 202 (assuming it is a smartcard—i.e., an IC card) may also be essentially conventional. However, because of operation of other components of the system, as described below, the card identification number stored in the payment card/device 202 may be used in the system 202 in a manner that is different from the treatment in a conventional payment system of the customary PAN (primary account number) stored in a conventional IC payment card. Moreover, the card identification number stored in the payment card/device 202 may be different (in the way it is used) from a payment token as proposed in the "Payment Token Interoperability Standard" published in November 2013 by MasterCard International Incorporated, Visa and American Express. The chief difference, as will be understood from the ensuing description, is that the card identification number as stored in the payment card/device 202 may be used to access the digital wallet maintained by a wallet service provider (reference numeral 203 in FIG. 2) for a user/cardholder 205. The user 205 should be understood to be the authorized individual who carries and presents the payment card/device 202, and who has enrolled and established a digital wallet with the wallet service provider 203.

In some embodiments, the card identification number stored in the payment card/device 202 may be in the same format as a conventional PAN (e.g., 16 or 15 digits) or in the same format as a payment token as proposed in the above-referenced Payment Token Interoperability Standard.

In some embodiments, the payment card/device 202 may store, in addition to the card identification number, a bit or byte (or other data element) that serves as a flag to indicate that the payment identification number is available for use in accessing the user's digital wallet. This data element may hereinafter be referred to as the "wallet flag".

In some embodiments, the payment card/device 202 may be constituted by a substantially conventional magnetic stripe card, or as a payment-enabled mobile device, but again storing a card identification number that the system 200 may use to access the cardholder's digital wallet and also storing a wallet flag.

Also included in the payment system 200 is a POS terminal 204 as configured in accordance with aspects of the present invention. Details of the POS terminal 204 are described below, with reference to FIG. 3 and other drawings. The POS terminal 204 may have a generally conventional reader component 206 associated with it. The reader component 206 may read the payment card/device 202 in a conventional manner. The POS terminal 204 may be installed at a merchant's premises in a "brick-and-mortar" retail store and may be operated by a sales associate employed by the merchant. As will be seen, the user/cardholder 205 may also have significant interaction with the POS terminal 204 in addition to presenting to it his/her payment card/device 202.

Also depicted in FIG. 2 are an acquirer computer 108, a payment network 110 and a payment card issuer server computer 112. All of these components may be constituted in a substantially conventional manner and also may operate generally in accordance with conventional practices. It is worth noting again that the number of such components in the system 200 may in a practical embodiment be greater than one. Several payment networks may actually be involved, along with quite a large number of card account issuers and acquiring financial institutions, and of course numerous merchants and many, many cards and cardholders. As will be understood from the above description of the conventional payment system 100, the payment system 200 shown in FIG. 2 may process many transactions, including simultaneous transactions.

Details of the wallet service provider 203 will be provided below in connection with FIG. 4 and other drawings. Again it is possible that a number of wallet service providers may be involved in a practical embodiment of the payment system 200. It should also be understood that many key functions of the wallet service provider 203 may be performed by one or more computers operated by it or on its behalf. Consequently, the block 203 will also be taken to represent at least one wallet service provider computer.

Figure 3:
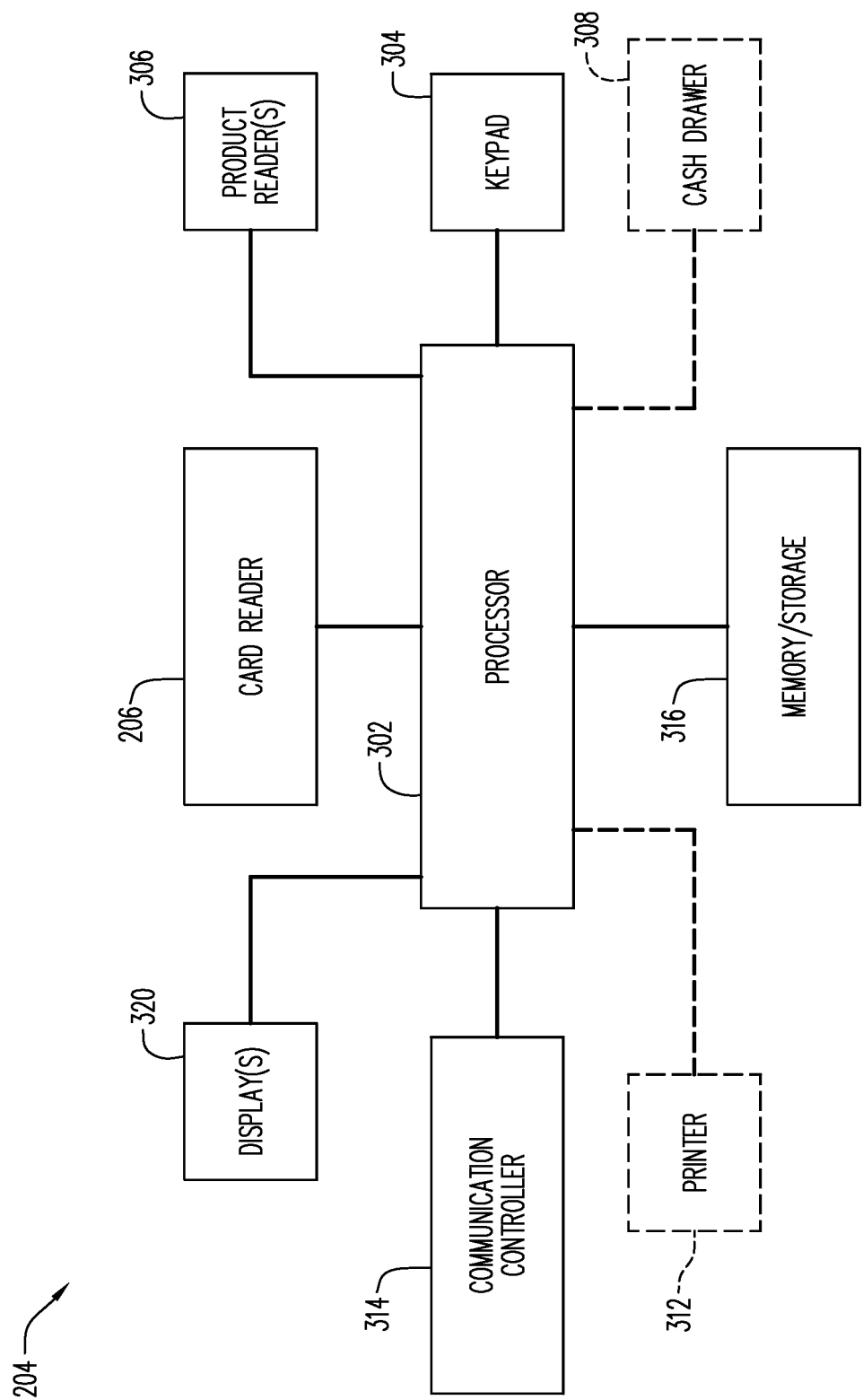
FIG. 3 is a block diagram that illustrates a point of sale (POS) terminal provided in accordance with aspects of the present invention and that may be part of the system of FIG. 2.

FIG. 3 is a block diagram that illustrates the POS terminal 204 shown in FIG. 2 and provided in accordance with aspects of the present invention.

In some embodiments, the POS terminal 204 may be conventional in its hardware aspects, except that—as noted below—the POS terminal 204 may have an enhanced customer-facing display and user interface capability. Further, the POS terminal 204 may be programmed in accordance with aspects of the present disclosure to provide functionality as described herein.

The POS terminal 204 may include a processing element (or elements) such as the processor 302 shown in FIG. 3. The processor 302 may, for example, be a conventional microprocessor, and may operate to control the overall functioning of the POS terminal 204.

In addition to the enhanced customer display and user interface described herein, the POS terminal 204 may also include conventional peripheral components, in communication with and/or controlled by the processor 302, such as: (a) a keypad 304 for receiving input from the sales associate operator of the POS terminal; (b) a product reader 306 for reading any form of unique product identifier, such as a barcode or RFID, that appears on, or is attached to, products brought to the terminal for purchase; (c) a cash drawer 308 for storing cash received from customers; (d) a printer 312 for printing out sales receipts; and (e) a communication controller 314 for allowing the processor 302, and hence, the POS terminal 204 to engage in communication over data networks with other devices (e.g., the wallet service provider computer 203 and/or the acquirer computer 108).

In addition, the POS terminal 204 may include one or more memory and/or data storage devices (indicated collectively at 316), which may comprise any combination of one or more of a hard disk drive, RAM (random access memory), ROM (read only memory), flash memory, etc. The memory/data storage device(s) 316 may store software and/or firmware that programs the processor 302 and the POS terminal 204 to perform functionality as described herein. Thus the memory/data storage device(s) 316 may be in communication with the processor 302. Further, the POS terminal 204 may include one or more housings (not shown) which contain and/or support one or more of the other components shown in FIG. 3.

It is of course well known for POS terminals to include one or more displays, including at least one customer-facing display. In accordance with aspects of the present invention, the POS terminal 204, as depicted in FIG. 3, may include a number of display components 320 that are in communication with and controlled by the processor 302. Advantageously, the display components 320 may include a customer-facing display device and/or touchscreen (not shown apart from block 320) that may be somewhat larger than customer displays as commonly provided in POS terminals. For example, the display components may include a 5- to 7-inch touchscreen that is within easy reach for interaction by the user/customer/cardholder 205 shown in FIG. 2. As will be seen, the customer-facing touchscreen may be used to display downloaded wallet data to the user 205 and to allow the user 205 to indicate a selection he/she wishes to make among his/her payment card accounts represented by the downloaded wallet data.

In addition, the POS terminal may include a card reader 206 as was referred to above in connection with FIG. 2. The card reader 206 may be constructed and may operate in a conventional manner. The card reader 206 may be in communication with the processor 302.

Figure 4:
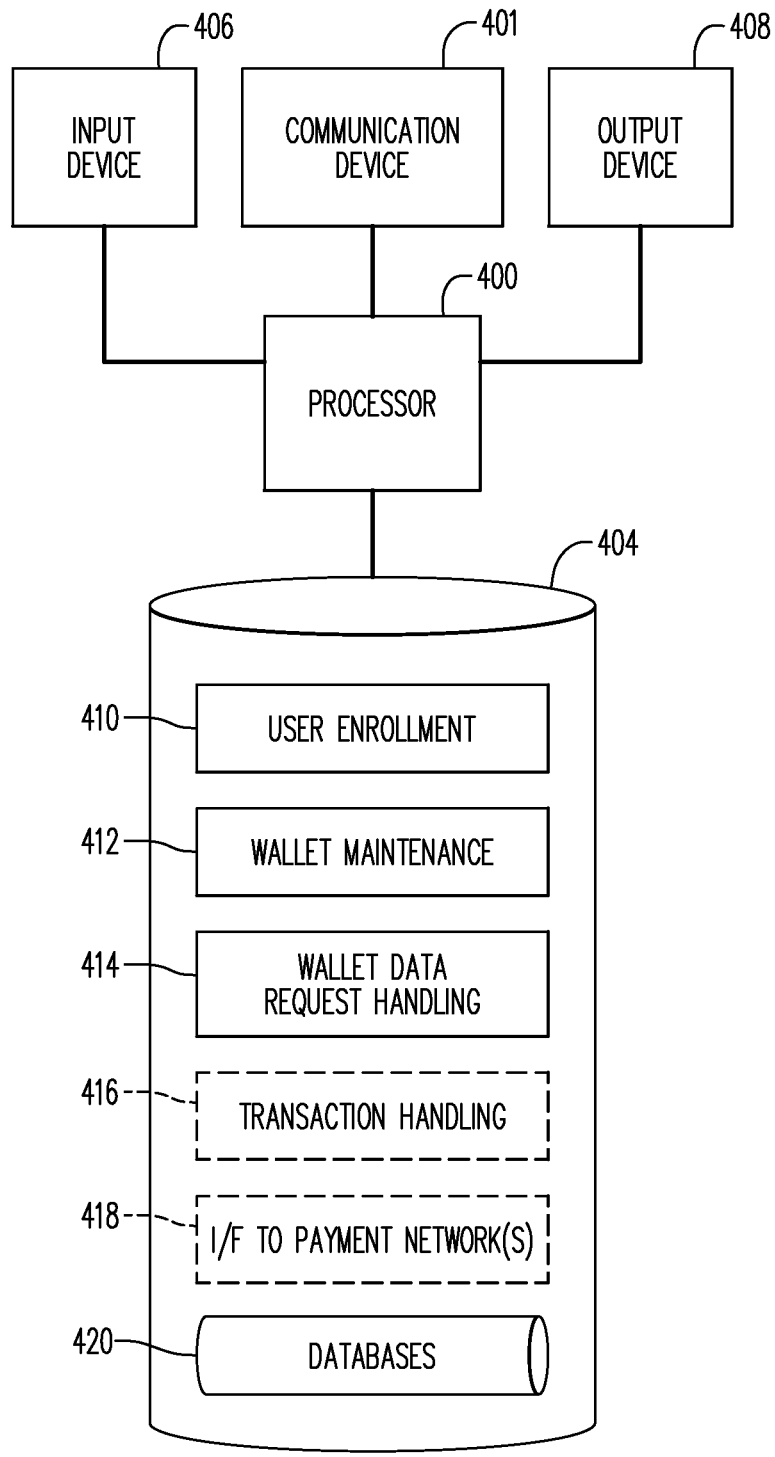
FIG. 4 is a block diagram that illustrates a computer system that may be operated by a wallet service provider as part of the system of FIG. 2 and in accordance with aspects of the present invention.

FIG. 4 is a block diagram that illustrates an example embodiment of the wallet service provider computer 203 as shown in FIG. 2 and provided in accordance with aspects of the present invention.

Referring now to FIG. 4, the wallet service provider computer 203 may be conventional in its hardware aspects but may be controlled by software to cause it to function as described herein. For example, the wallet service provider computer 203 may be constituted by conventional server computer hardware.

The wallet service provider computer 203 may include a computer processor 400 operatively coupled to a communication device 401, a storage device 404, an input device 406 and an output device 408.

The computer processor 400 may be constituted by one or more conventional processors. Processor 400 operates to execute processor-executable steps, contained in program instructions described below, so as to control the wallet service provider computer 203 to provide desired functionality.

Communication device 401 may be used to facilitate communication with, for example, other devices (such as the POS terminal 204, other POS terminals which are not shown, and other components of the payment system 200). Communication device 401 may comprise numerous communication ports (not separately shown), to allow the wallet service provider computer 203 to communicate simultaneously with a number of other computers and other devices, including communications as required to simultaneously handle numerous transactions.

Input device 406 may comprise one or more of any type of peripheral device typically used to input data into a computer. For example, the input device 406 may include a keyboard and a mouse. Output device 408 may comprise, for example, a display and/or a printer.

Storage device 404 may comprise any appropriate information storage device, including combinations of magnetic storage devices (e.g., hard disk drives), optical storage devices such as CDs and/or DVDs, and/or semiconductor memory devices such as Random Access Memory (RAM)

devices and Read Only Memory (ROM) devices, as well as so-called flash memory. Any one or more of such information storage devices may be considered to be a computer-readable storage medium or a computer usable medium or a memory.

Storage device 404 stores one or more programs for controlling processor 400. The programs comprise program instructions (which may be referred to as computer readable program code means) that contain processor-executable process steps of the wallet service provider computer 203, executed by the processor 400 to cause the wallet service provider computer 203 to function as described herein.

The programs may include one or more conventional operating systems (not shown) that control the processor 400 so as to manage and coordinate activities and sharing of resources in the wallet service provider computer 203, and to serve as a host for application programs (described below) that run on the wallet service provider computer 203.

The programs stored in the storage device 404 may also include a user enrollment application program 410 that controls the processor 400 to enable the wallet service provider computer 203 to handle requests from users to subscribe to digital wallet services provided by the wallet service provider computer 203. The user enrollment application program account may also operate to permit users to load their payment card accounts into their digital wallets maintained by the wallet service provider computer 203.

The storage device 404 may also store a wallet maintenance application program 412 that controls the processor 400 to enable the wallet service provider computer 203 to store and maintain the digital wallets that have been established by users in the wallet service provider computer 203.

In addition, the storage device 404 may store an application program 414 for handling requests from POS terminals for wallet data, in a manner described below, for example, in connection with FIG. 8 or FIG. 9. Thus the request handling application program 414 may control the processor 400 such that the wallet service provider computer 203 provides functionality related to requests for wallet data as described herein.

In some embodiments, the storage device 404 may store a payment transaction handling program 416, which controls the processor 400 to enable the wallet service provider computer 203 to serve the role of acquirer for payment card account transactions with respect to the payment network 110.

Continuing to refer to FIG. 4, and in some embodiments of the wallet service provider computer 203, the storage device 404 may also store a payment network interface program 418, which provides a data communications interface to the payment network 110 (FIG. 2)—and possibly to other payment networks as well—to allow for submission of authorization requests by the wallet service provider computer 203 and receipt of authorization responses.

The storage device 404 may also store, and the wallet service provider computer 203 may also execute, other programs, which are not shown. For example, such programs may include a reporting application, which may respond to requests from system administrators for reports on the activities performed by the wallet service provider computer 203. The other programs may also include, e.g., one or more data communication programs, a database management program, device drivers, etc.

The storage device 404 may also store one or more databases 420 required for operation of the wallet service provider computer 203. Such databases may include, for example, a database (not separately indicated in FIG. 4) for storing data corresponding to digital wallets maintained for users/cardholders in the wallet service provider computer 203.

In some embodiments of the system 200, individuals who have a number of payment card accounts, perhaps from varying issuers, may enroll with the wallet service provider to set up digital wallets for themselves to be maintained by the wallet service provider. For example, they may do so by interacting with a webpage that is hosted by the wallet service provider computer 203. Once an individual user has established a user account via the webpage, he/she may request the wallet service provider computer 203 to establish his/her digital wallet, which may take the form of a data partition in a database 420 (FIG. 4) stored in the wallet service provider computer 203. The user may also take advantage of software tools provided through the wallet service provider computer 203 to add one or more of the user's payment card accounts to his/her digital wallet. In some embodiments, this may be done by authorizing the wallet service provider computer 203 to contact the issuers of the payment card accounts to initiate a process of loading the relevant account data into the user's digital wallet. In some embodiments, as part of this process, the issuers may contact the user to confirm that the request from the wallet service provider computer 203 is indeed authorized by the user. In other embodiments, the user may individually send requests to his/her payment card account issuers that they transfer the payment account data to the wallet service provider computer 203 for inclusion in the user's digital wallet.

In addition to including payment card accounts such as credit card accounts and debit card accounts to their digital wallets, the users may include other types of accounts as well, such as gift card accounts, loyalty rewards accounts, benefit disbursement accounts, transit access accounts, etc. The accounts may all be branded from one payment network, or there may be accounts branded from more than one payment network in the user's digital wallet.

In some embodiments, the user's digital wallet may be indexed in the wallet service provider computer 203 by an identification number, which may be in the same format as a PAN. In some embodiments, the wallet service provider and/or one of the user's payment card account issuers may issue the above-mentioned payment card/device 202 to the user with the wallet identification number stored in the payment card/device 202 as the card identification number. In this way, the user's digital wallet may be associated with the identification number carried by his/her payment card/device.

Figure 5:
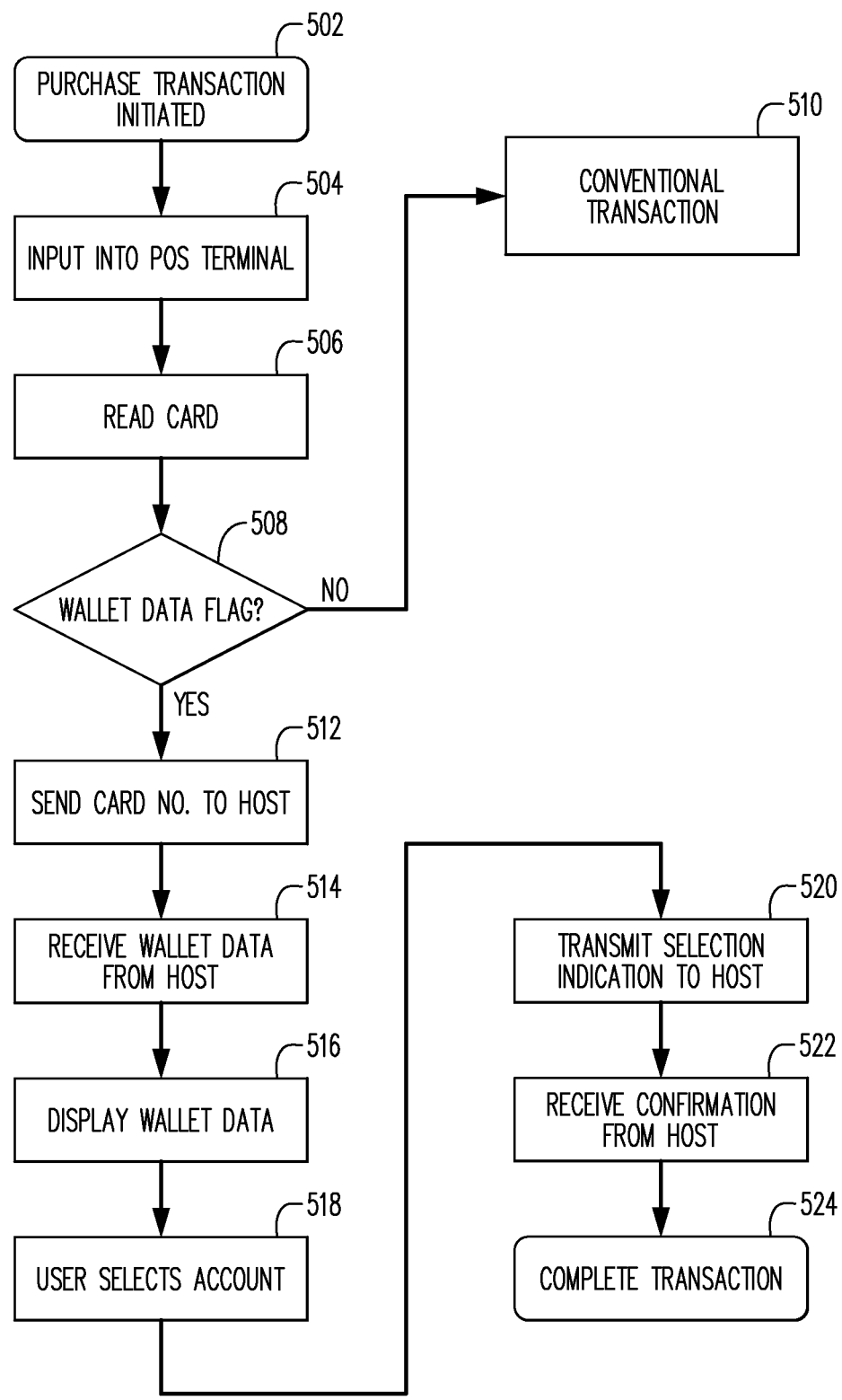
FIG. 5 is a flow chart that illustrates a transaction process that may be performed by the POS terminal of FIG. 3 in accordance with aspects of the present invention.

FIG. 5 is a flow chart that illustrates a transaction process that may be performed by the POS terminal 204 in accordance with aspects of the present invention.

At block 502 in FIG. 5, a purchase transaction is initiated. For example, in a brick-and-mortar retail store, a customer (user 205—FIG. 2—the holder of the payment card device 202) may select merchandise and present it for purchase at a point-of-sale counter.

At 504 in FIG. 5, transaction data is input into the POS terminal 204, which may be located at the point-of-sale counter. This may occur, for example, by the merchant sales associate operating the POS terminal 204 by, e.g., scanning barcodes on the merchandise to allow input to the POS terminal 204 of the identifiers of the merchandise items and also to allow for lookup by the POS terminal 204 of price information for the merchandise items. As a result of this operation, the POS terminal 204 may calculate a total amount for the purchase transaction (transaction amount).

At 506, the POS terminal 204 may read the card identification number from the payment card/device 202 via the card reader component 206. The POS terminal may read other information as well from the payment card/device 202, including data indicative of whether the payment card/device 202 stores the above-mentioned wallet flag.

In the process of FIG. 5, a decision block 508 follows block 506. At decision block 508, the POS terminal 204 may determine whether the data read from the payment card/device 202 includes the wallet flag. If such is not the case, then the process of FIG. 5 may branch from decision block 508 to block 510. At block 510, the POS terminal 204 may handle the transaction in a conventional manner—i.e., by interpreting the card identification number as a PAN or payment token and transmitting a payment authorization request to the acquirer computer 108 using the PAN or payment token.

As will be seen, the wallet flag in effect may indicate to the POS terminal 204 that the card number read at 516 should be transmitted to the wallet service provider computer 203 rather than being included in a conventional payment transaction authorization request. Considering again decision block 508, if the POS terminal 204 makes a positive determination at that point (i.e., if the POS terminal 204 determines that the wallet flag is present), then block 512 may follow decision block 508. At block 512, the POS terminal 204 transmits a message to the wallet service provider computer 203. (It will be appreciated that the wallet service provider computer 203 may be considered a remote host computer relative to the POS terminal 204.) The POS terminal 204 may include in the message the card identification number that it read from the payment card/device 202 at block 506. The message in effect constitutes a request from the POS terminal 204 to the wallet service provider computer 203 to download wallet data that corresponds to the card identification number, i.e., data from the digital wallet maintained by the wallet service provider computer 203 for the user 205 of the payment card/device 202.

Block 514 may follow block 512 in the process of FIG. 5. At block 514, the POS terminal 204 may receive wallet data for the user (i.e., from the user's digital wallet) from the wallet service provider computer 203. For example, the wallet data may indicate the payment card accounts that have previously been stored in the user's digital wallet maintained in the wallet service provider computer 203. In some embodiments, the wallet data may include or take the form of the PANs or payment tokens that represent the user's payment card accounts. In some embodiments, the wallet data may be in the form of images (e.g., synthetic images) of the faces of payment account cards that represent the user's payment card accounts. In some embodiments, the images may include the corresponding PAN or payment token, and may also include branding from the relevant payment network and from the issuer of the respective payment card account.

In other embodiments, the wallet data may include nicknames that the user has previously assigned to his payment card accounts. The nicknames may include such designations as "main card", "business expenses card", "travel card", "birthday gift card", etc. In addition or alternatively, the nicknames may be or include the name of the financial institution that issued the payment card account in question.

Figure 6:
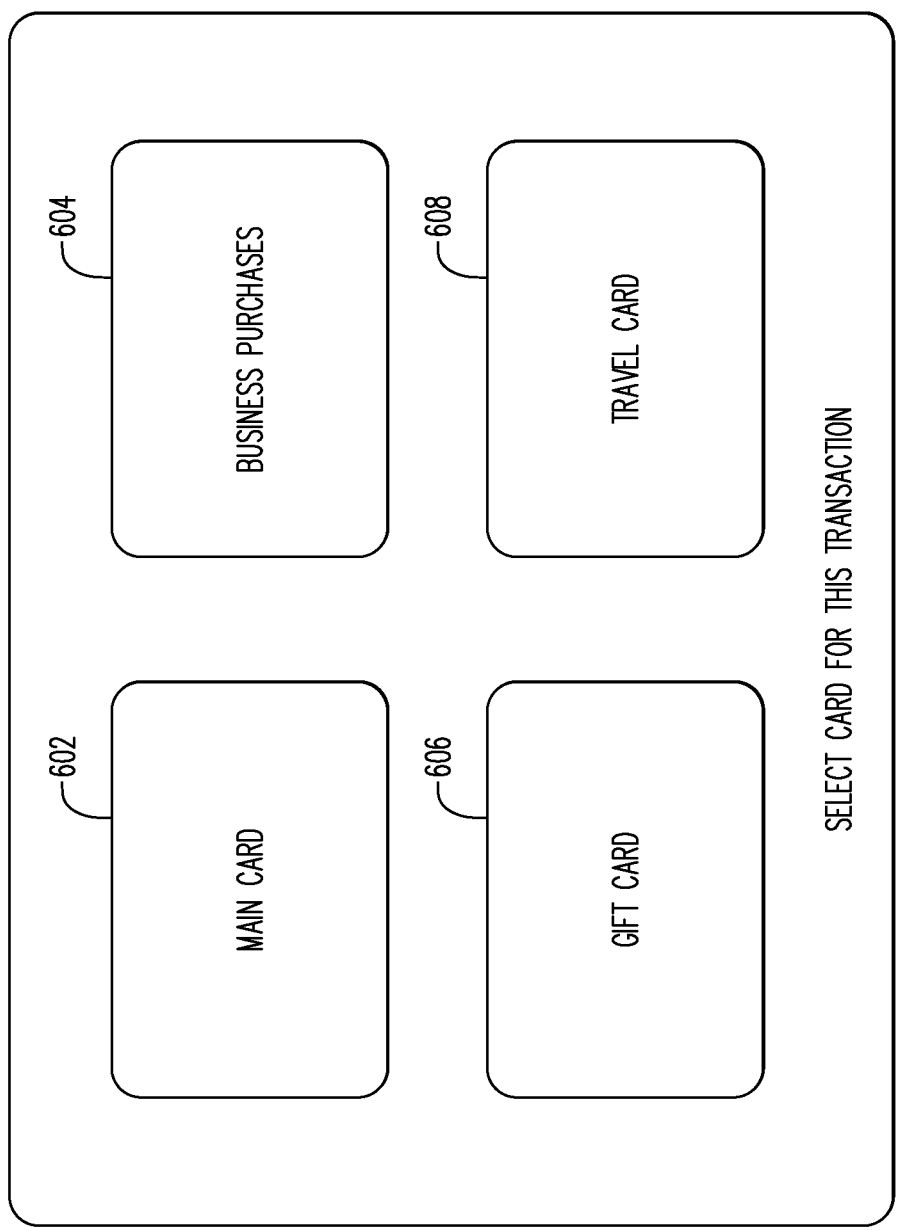
FIG. 6 shows an example screen display that may be presented by the POS terminal of FIG. 3 in connection with the process of FIG. 5.

Block 516 may follow block 514. At block 516, the POS terminal 204 may display some or all of the wallet data to the user 205 on a user-facing (i.e., customer-facing) display device. FIG. 6 shows an example of a screen display that includes wallet data and that is displayed by the POS terminal 204. For present purposes it is assumed that the screen display of FIG. 6 is shown on a touchscreen component of the POS terminal 204. It is also assumed that the displayed wallet data in FIG. 6 corresponds to nicknames that the user 205 had previously assigned to his/her payment card accounts. Thus, the screen display of FIG. 6 includes virtual buttons 602, 604, 606 and 608, which respectively correspond to the user's "main card", "business purchases", "gift card" and "travel card" payment card accounts. In other embodiments, the screen display may use some or all of the other types of wallet data described above in connection with block 514. Thus, for example, simulated images that resemble actual physical payment cards may replace some or all of the nickname card designations seen in FIG. 6.

Block 518 may follow block 516 in the process of FIG. 5. At block 518 the user selects one of the payment card accounts for which wallet data was displayed by the POS terminal 204 at 516. Thus, the POS terminal 204 may receive an indication from the user 205 of which payment card account the user is selecting for use in the current transaction. The user 205 may provide this indication, for example, by touching one of the virtual buttons 602, 604, 606 or 608 shown in FIG. 6.

Block 520 may follow block 518 in the process of FIG. 5. At block 520, the POS terminal 204 may transmit another message to the wallet service provider computer 203. This message may include data that indicates which of the payment card accounts was selected by the user 205 at 518.

Block 522 may follow block 520. At block 522, the POS terminal 204 may receive, from the wallet service provider computer 203, a confirmation that payment has been duly implemented for the current transaction via the payment card account that the user 205 selected at 518.

Block 524 may then follow. At block 524 the purchase transaction at the retail store is completed. For example, the POS terminal 204 may display to the merchant's sales associate an indication that payment has been acknowledged/confirmed, and may print a suitable receipt for the user 205. The user 205 may then leave the retail store with the purchased merchandise and the receipt.

Figure 7:
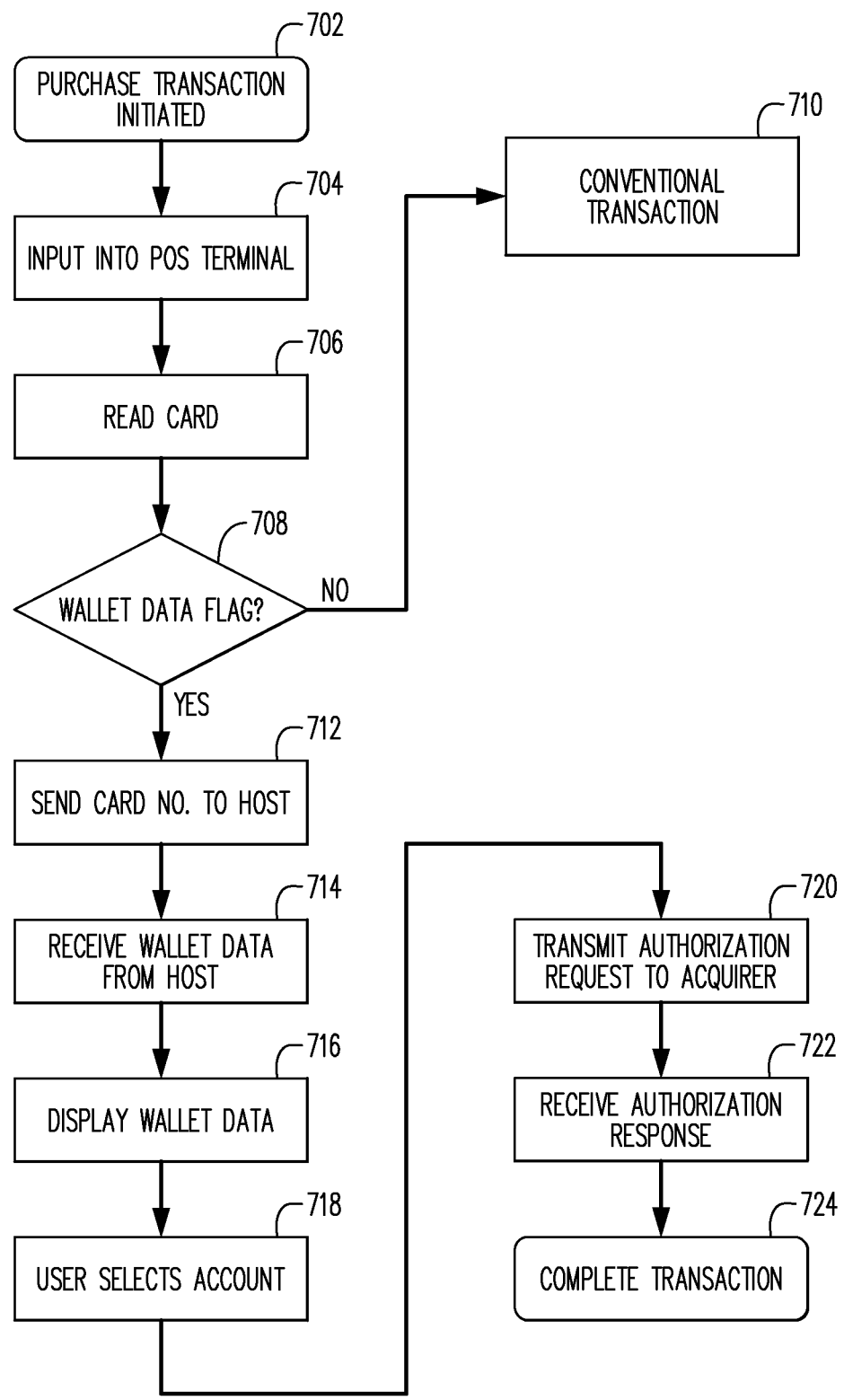
FIG. 7 is a flow chart that illustrates an alternative transaction process that may be performed by the POS terminal of FIG. 3 in accordance with aspects of the present invention.

FIG. 7 is a flow chart that illustrates an alternative transaction process that may be performed by the POS terminal 204 in accordance with aspects of the present invention. The process of FIG. 7 is in many respects similar to the process of FIG. 5. The chief difference, as will be seen, is that in the process of FIG. 7, a conventional transaction authorization request is transmitted by the POS terminal 204 to the acquirer computer 108 to access a payment card account that the user selected from his/her digital wallet at the point of sale.

Turning now to details of the process of FIG. 7, that process includes blocks 702, 704, 706, 708, 710 and 712, which may be identical to blocks 502, 504, 506, 508, 510 and 512 as described above in connection with FIG. 5. Accordingly, blocks 702, 704, 706, 708, 710 and 712 will not be described at this point, but rather the reader is referred to the above description of the process of FIG. 5.

Block 714 follows block 712 in the process of FIG. 7. Block 714 may include the same processing by the POS terminal 204 as was described above in connection with block 514 of FIG. 5. In addition, in connection with block 714 (as may or may not be the case with block 514), the POS terminal 204 receives—from the wallet service provider computer 203—a PAN or a payment token for each of the payment card accounts in the user's digital wallet as maintained by the wallet service provider computer 203.

(As is known to those who are skilled in the art, the term "payment token" refers to a number or other string of characters that replaces a PAN during a portion of a process involving a transaction in a payment system; reference is made to the above-mentioned Payment Token Interoperability Standard. Also, at this point the term "indicator number" will be introduced; the latter term should be understood to include either a PAN or a payment token.)

Blocks 716 and 718 follow block 714 in the process of FIG. 7. Blocks 716 and 718 may be performed in the same manner as blocks 516 and 518, as described above. For example, at block 716 the POS terminal 204 may display a screen display like that shown in FIG. 6, or another format or type of display may be shown at that point, as described above in connection with block 516.

In the process of FIG. 7, block 720 follows 718. Block 720 is a departure from the process of FIG. 5. At block 720, the POS terminal 204 transmits a conventional transaction authorization request to the acquirer computer 108 (FIG. 2). The authorization request includes an indicator number that corresponds to the payment card account selected by the user 205 at block 718; it will be understood that the indicator number in question had been downloaded to the POS terminal 204 from the wallet service provider computer 203 at block 714 as part of the wallet data.

Block 722 follows block 720. At block 722 the POS terminal receives a conventional transaction authorization response from the acquirer computer 108. Assuming that everything was in order with the payment card account selected by the user 205, then the authorization response includes approval of the authorization request, and block 724 then follows. At block 724 the purchase transaction at the retail store is completed. For example, the POS terminal 204 may display to the merchant's sales associate an indication that the authorization request was approved, and may print a suitable receipt for the user 205. The user 205 may then leave the retail store with the purchased merchandise and the receipt.

Figure 8:
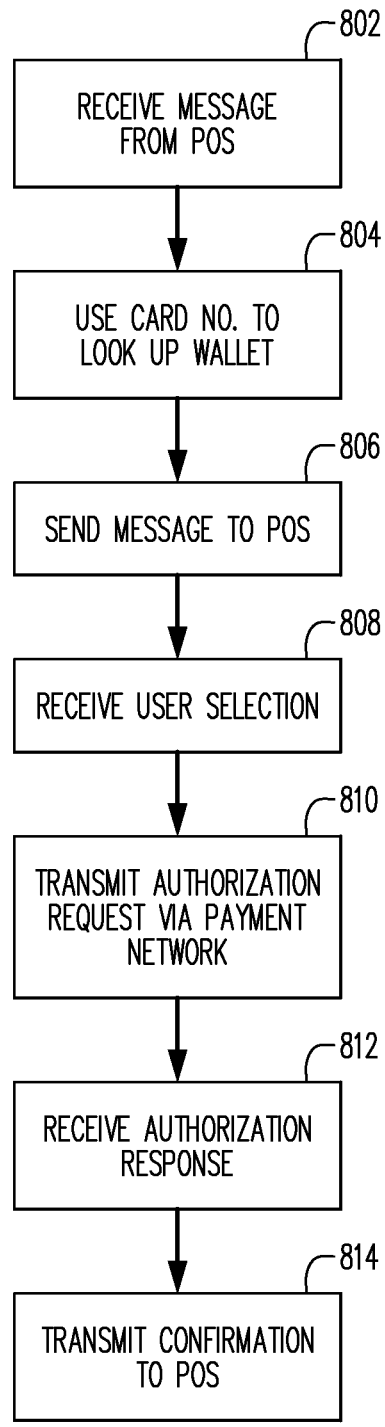
FIG. 8 is a flow chart that illustrates a process that may be performed by the computer system of FIG. 4 in connection with the process of FIG. 5.

FIG. 8 is a flow chart that illustrates a process that may be performed by the wallet service provider computer 203 in connection with the process of FIG. 5.

At block 802 in FIG. 8, the wallet service provider computer 203 may receive the message that was sent by the POS terminal 204 at block 512 in FIG. 5. It will be recalled that that message includes the card number that was read by the POS terminal 204 at block 506 in FIG. 5. The card number serves as an index or reference to the digital wallet maintained by the wallet service provider computer 203 for the user 205 (FIG. 2).

Block 804 follows block 802 in the process of FIG. 8. At block 802, the wallet service provider computer 203 uses the card number that it received from the POS terminal at 802 to look up the digital wallet maintained by the wallet service provider computer 203 for the user 205 who is present at the POS terminal 204.

Block 806 follows block 804. At block 806, the wallet service provider computer 203 transmits to the POS terminal 204 the message described above in connection with block 514 of FIG. 4. It will be recalled that the latter message includes at least some of the data stored in the user's digital wallet—i.e., at least enough to identify to the user 205 the payment card accounts that are available for access via the digital wallet.

Block 808 follows block 806. At block 808, the wallet service provider computer 203 receives from the POS terminal 204 the message that was described above in connection with block 520 in FIG. 5. It will be recalled that the message of block 520 contains an indication as to which payment card account the user 205 had selected at block 518 in FIG. 5. With this information in hand, the wallet service provider computer 203 is able to determine/look up the indicator number for the payment card account that the user 205 has selected for the current transaction.

Block 810 follows block 808. At block 810, the wallet service provider computer 203 transmits a transaction authorization request via the payment network 110. In this regard, at least from the point of view of the payment network 110, the wallet service provider computer 203 is acting substantially like a conventional transaction acquirer. The indicator number that corresponds to the payment card account selected by the user 205 is included in the authorization request, as a PAN or a payment token, as the case may be.

Block 812 follows block 810. At block 812, the wallet service provider computer 203 receives an authorization response from the payment network 110. (It will be understood that the authorization response may have originated from the issuer of the payment card account selected by the user at the point of sale.) Assuming everything was in order with the payment card account selected by the user 205, then the authorization response includes approval of the authorization request transmitted at 810. Block 814 then follows. At block 814, the wallet service provider computer 203 transmits—to the POS terminal 204—the confirmation message that was referred to above in connection with block 522 of FIG. 5.

Figure 9:
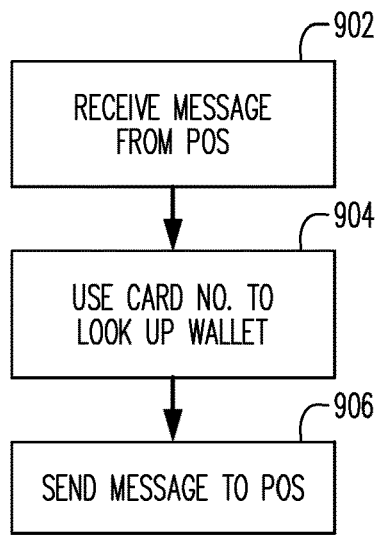
FIG. 9 is a flow chart that illustrates an alternative process that may be performed by the computer system of FIG. 4 in connection with the process of FIG. 7.

FIG. 9 is a flow chart that illustrates an alternative process that may be performed by the wallet service provider computer 203 in connection with the process of FIG. 7.

A chief difference between the process of FIG. 9 and the process of FIG. 8 is that in the former the wallet service provider computer 203 does not function as an acquirer vis a vis the payment network 110.

Thus the process of FIG. 9 is shown as including blocks 902, 904 and 906, which are similar to blocks 802, 804 and 806 as described above in connection with FIG. 8. More specifically, block 902 of FIG. 9 corresponds to receiving the message sent by the POS terminal 204 at block 712 in FIG. 7; and block 906 corresponds to transmitting the message received by the POS terminal 714 in FIG. 7.

With a payment system as described above in connection with FIGS. 2-9, a user can conveniently access his or her centrally stored digital wallet by simply presenting a payment card or similar device at the point of sale. Moreover, with a processing approach such as that illustrated in FIGS. 5 and 8, the user's digital wallet may come to serve as an information repository and information source for most if not all of the user's payment card account purchases—spread across all of his/her payment card accounts. This may be a significant advantage to the user in acquiring an overview of his/her purchasing habits. (Even if the process of FIGS. 7 and 9 were employed, the wallet service provider computer 203 could still usefully accumulate purchasing information for the user so long as the request message from the POS terminal 204 to the wallet service provider computer 203 would typically include transaction information (e.g., merchant identifier and transaction total) for the current transaction.)

Figure 10:
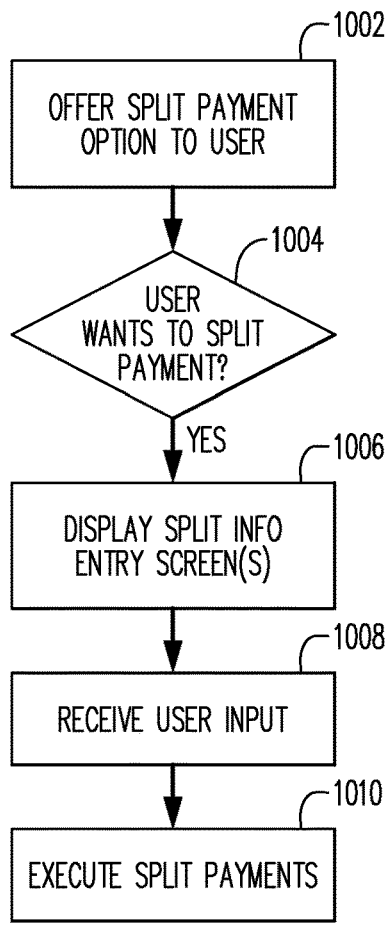
FIG. 10 is a flow chart that illustrates additional process steps that may be performed by the POS terminal of FIG. 3 in accordance with aspects of the present invention.

FIG. 10 is a flow chart that illustrates additional process steps that may be performed by the POS terminal 204 in accordance with aspects of the present invention. In particular, the process steps of FIG. 10 may supplement the processes of FIGS. 5 and 7-9 by providing functionality that allows the user 205 to split the payment for the current transaction among two or more of the payment card accounts in his/her digital wallet. Thus, at least some of the process steps of FIG. 10 may be incorporated in the processes described above.

At 1002 in FIG. 10, the POS terminal 204 may prompt the user 205 to indicate whether he/she wishes to split the payment for the transaction between two or more of the payment card accounts for which the POS terminal received identifying information from the wallet service provider computer 203.

A decision block 1004 may follow block 1002 in FIG. 10. At decision block 1004, the POS terminal 204 may determine whether the user has indicated that he/she wishes to split the payment. If so, then block 1006 may follow decision block 1004.

At block 1006, the POS terminal 204 may display one or more display screens and/or data entry screens to allow the user to indicate his/her wishes in regard to how the payment for the transaction should be split among his/her payment card accounts. For example, in some embodiments, the POS terminal 204 may first prompt the user 205 to select a payment card account for the first portion of the payment. It may then further prompt the user to indicate a dollar amount to be charged to the selected payment card account. The user 205 may next be prompted to select another payment card account. Upon doing so, he/she may next be prompted either to indicate that the balance of the transaction total is to be charged to the second account selected, or to indicate a dollar amount that is smaller than the remaining balance of the transaction total.

In other embodiments, the user may be prompted to select particular purchased items to be charged to one account, while other items are to be charged to another account. With this embodiment, for example, the user may be enabled to divide his/her purchases (in a single transaction/store visit) between personal items to be charged to a personal payment card account and other items to be used for a business that the user operates, with the latter items accordingly to be charged to a payment card account used for the business operations.

In any case, block 1008 may follow block 1006. At block 1008 the POS terminal 204 may receive input from the user 205 in response to prompts that it provided. Block 1010 may then follow. At block 1010, the requested split payment may be executed. For example, in the process of FIG. 5, the message sent by the POS terminal 204 to the wallet service provider computer 203 may indicate two or more payment card accounts selected by the user 205, and the respective amounts to be charged to those selected accounts. Alternatively, block 720 of FIG. 7 may be modified from the above description thereof such that the POS terminal 204 transmits more than one transaction authorization request, with the plural authorization requests effectively implementing the user's desired splitting of the transaction payment.

In some embodiments, the payment system 200 may include some POS terminals (not shown) that lack some of the capabilities of the POS terminal 204 as described herein. For example, some POS terminals may lack sufficient customer-facing display devices and/or may not be programmed to support customer access to the customer's digital wallet via presentation of a corresponding payment card. In such cases, the POS terminal in question (different from the POS terminal 204 as described above) may transmit an apparently conventional authorization request to an acquirer, using the card number carried on the user's payment card/device. The system 200 may operate such that the card number in question causes the authorization request to be routed for charging to an account that is a default account pre-designated for such situations. For example, there may be a back-up payment card account for which the card number serves as a PAN and/or the payment card account to which the card number points may be one of the payment card accounts that the user has enrolled in his/her digital wallet.

In some embodiments, one or more accounts included in the user's digital wallet may be private label store credit card accounts. In such a case, the corresponding account information would be downloaded by the wallet service provider computer 203 at block 806 or 906 only if the POS terminal that requested the download is operated by the store or store chain that issued the account in question.

In some embodiments, one or more accounts included in the user's digital wallet may be gift card accounts or other types of accounts in addition to those referred to above.

In some embodiments, the payment card/device 202 and/or the POS terminal 204 and/or the information downloaded by the wallet service provider computer 203 may specify one or more cardholder verification methods (CVMs) that the user must comply with in order for the transaction to go forward. For example, the user may be required to successfully enter a PIN (personal identification number) associated with the payment card/device and/or associated with one or more of the payment card accounts in the user's digital wallet.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

The flow charts and descriptions thereof herein should not be understood to prescribe a fixed order of performing the method steps described therein. Rather the method steps may be performed in any order that is practicable.

As used herein and in the appended claims, the term "payment card system account" includes a credit card account, a deposit account that the account holder may access using a debit card, a prepaid card account, or any other type of account from which payment transactions may be consummated. The terms "payment card system account" and "payment card account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card, debit card, prepaid card, or other type of payment instrument, whether an actual physical card or virtual.

As used herein and in the appended claims, the term "payment card system" refers to a system for handling purchase transactions and related transactions. An example of such a system is the one operated by MasterCard International Incorporated, the assignee of the present disclosure. In some embodiments, the term "payment card system" may be limited to systems in which member financial institutions issue payment card accounts to individuals, businesses and/or other organizations.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
   providing computer implemented instructions;
   executing the provided computer implemented instructions including:
   reading a digital wallet card identification number from the user's payment device at a point of sale (POS) terminal;
   determining at the POS terminal a flag is present in the user's payment device or a flag is absent in the user's payment device by reading the user's payment device, wherein the flag is a bit or byte element that indicates the digital wallet card identification number is operative to access a digital wallet;
   if the POS terminal determines that the flag is present in the user's payment device:
      transmitting based on the determined presence of the flag a message including a digital wallet card identification number and a wallet data request from the POS terminal to the remote wallet service provider computer;
      in response to transmitting the message, receiving the requested wallet data at the POS terminal from the remote wallet service provider computer, the wallet data including a plurality of payment accounts associated with the digital wallet card identification number;
      displaying in a user-facing visual direction, the wallet data at the POS terminal, wherein the displayed wallet data includes an individual selectable representation including a nickname each of the plurality of payment accounts associated with the digital wallet card identification number;
      receiving a selection indication from a user at the POS terminal, the selection indication including one of said payment accounts, and
      transmitting by the POS terminal an authorization request to an acquirer computer including the selected payment account selected by the user at the POS terminal; and
      receiving from the acquirer computer, an authorization response approval of the authorization request, wherein the received approval completes a purchase transaction;
   if the POS terminal determines that a flag is absent in the user's payment device:
      routing based on the absence of the flag a message including the card identification number to the acquirer computer; and
      receiving by the acquirer computer the authorization response approval of the authorization request, wherein the received approval completes the purchase transaction.

2. The method of claim 1, further comprising:
   before the transmitting step, reading the flag from the user's payment device by the POS terminal, the flag for indicating that the card number should be transmitted by the POS terminal to the wallet service provider computer and not to a transaction acquirer.

3. The method of claim 1, wherein the transmitted message is a first message;
   and further comprising:
      transmitting a second message from the POS terminal to the remote wallet service provider computer, the second message including data that represents the received selection indication.

4. The method of claim 1, wherein the displaying step includes displaying the wallet data on a display device that is part of the POS terminal.

5. The method of claim 4, wherein the displayed wallet data includes card images that respectively represent the payment accounts.

6. The method of claim 4, wherein the account nicknames are assigned to the payment accounts by the user.

7. The method of claim 1, further comprising:
   receiving, by the POS terminal, instructions from the user to split payment for a transaction between at least two of the payment accounts.

8. The method of claim 1, wherein the payment device is an integrated circuit card.

9. A method comprising:
   providing computer implemented instructions;
   executing the provided computer implemented instructions including:
   reading a digital wallet card identification number from a user's payment device at a point of sale (POS) terminal;
   determining at the POS terminal a flag is present in the user's payment device or a flag is absent in the user's payment device by reading the user's payment device, wherein the flag is a bit or byte element that indicates the digital wallet card identification number is operative to access a digital wallet;
   if the POS terminal determines that the flag is present in the user's payment device:
      receiving, in a wallet service provider computer, based on the determined presence of the flag, a message from the POS terminal, the message including the digital wallet card identification number and the flag read by the POS terminal from the user's payment device presented at the POS terminal;
      using the digital wallet card identification number to look up a wallet account that corresponds to a user of the payment device, the wallet account containing wallet data, the wallet data including a plurality of payment accounts associated with the digital wallet card identification number;
      transmitting at least some of the wallet data to the POS terminal from the wallet service provider computer;
      displaying the transmitted wallet data at the POS terminal, wherein the displayed wallet data includes an individual selectable representation including a nickname of each of the plurality of payment accounts associated with the digital wallet card identification number;
      receiving a selection indication from a user at the POS terminal, the selection indication including one of the payment accounts, and
      transmitting by the POS terminal an authorization request to an acquirer computer including the selected payment account selected by the user at the POS terminal; and
      receiving from the acquirer computer, an authorization response approval of the authorization request, wherein the received approval completes a purchase transaction;

if the POS terminal determines that the flag is absent in the user's payment device:
  routing based on the absence of the flag a message including the digital wallet card identification number to the acquirer computer; and
  receiving by the acquirer computer the authorization response approval of the authorization request, wherein the received approval completes the purchase transaction.

10. The method of claim 9, wherein the transmitted wallet data includes data that represents all of said plurality of payment accounts.

11. The method of claim 10, wherein the received message is a first message, and further comprising:
  receiving, in the wallet service provider computer, a second message from the POS terminal, the second message including data that indicates the selection of one of the plurality of payment accounts by the user.

12. The method of claim 11, further comprising:
transmitting an authorization request from the wallet service provider computer, the authorization request containing an indicator number that represents said selected one of the plurality of payment accounts.

13. A point of sale (POS) terminal, comprising:
a processor;
a memory in communication with the processor, the memory storing program instructions that control the processor;
a card reader operatively coupled to the processor;
a display device operatively coupled to the processor;
a communication device operatively coupled to the processor; and
a user input device operatively coupled to the processor;
the stored program instructions controlling the processor for:
  reading a digital wallet card identification number from a user's payment device at a point of sale (POS) terminal;
  determining at the PUS terminal a flag is present in the user's payment device or a flag is absent in the user's payment device by reading the user's payment device, wherein the flag is a bit or byte element that indicates the digital wallet card identification number operative to access a digital wallet;
if the PUS terminal determines that a flag is present in the user's payment device:
  transmitting based on the determined presence of the flag a message including a digital wallet card identification number and a wallet data request from the PUS terminal to the remote wallet service provider computer;
  in response to transmitting the message, receiving the requested wallet data as transmitted by the remote wallet service provider computer to the PUS terminal, the wallet data including a plurality of payment accounts associated with the digital wallet card identification number;
  displaying in a user-facing visual direction at the PUS terminal, the wallet data, wherein the displayed wallet data includes an individual selectable representation including a nickname of each of the plurality of payment accounts associated with the digital wallet card identification number; and
  receiving a selection indication from a user at the PUS terminal, the selection indication including one of said payment accounts, and
  transmitting by the PUS terminal an authorization request to an acquirer computer including the selected payment account selected by the user at the PUS terminal;
  receiving from the acquirer computer an authorization response approval of the authorization request, wherein the received approval completes a purchase transaction;
if the PUS terminal determines that the flag is absent in the user's payment device:
  routing based on the absence of the flag a message including the card identification number to the acquirer computer;
  receiving by the acquirer computer the authorization response approval of the authorization request, wherein the received approval completes a purchase transaction.

14. The POS terminal of claim 13, wherein the display device and the user input device are both constituted by a touchscreen that is operatively coupled to the processor.

15. The POS terminal of claim 13, wherein the processor receives the flag that is read by the card reader from the user's payment card, the flag for indicating that the digital wallet card identification number should be transmitted by the POS terminal to the wallet service provider computer and not to a transaction acquirer.

16. The POS terminal of claim 13, wherein:
the transmitted message is a first message; and
the processor controls the communication device to transmit a second message to the remote wallet service provider computer, the second message including data that represents the received selection indication.

17. The POS terminal of claim 13, wherein the processor receives, via the user input device, instructions from the user to split payment for a transaction between at least two of the payment accounts.

* * * * *